(12) United States Patent
Roy et al.

(10) Patent No.: US 8,712,188 B2
(45) Date of Patent: Apr. 29, 2014

(54) SYSTEM AND METHOD FOR DOCUMENT ORIENTATION DETECTION

(75) Inventors: Vandana Roy, Karnantaka (IN); Kadagattur Gopinatha Srinidhi, Karnataka (IN); Yifeng Wu, Vancouver, WA (US); Peter Bauer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 314 days.

(21) Appl. No.: 13/096,342

(22) Filed: Apr. 28, 2011

(65) Prior Publication Data

US 2012/0274991 A1 Nov. 1, 2012

(51) Int. Cl.
*G06K 9/36* (2006.01)
*G01C 9/00* (2006.01)
*H04N 1/40* (2006.01)

(52) U.S. Cl.
USPC ............ 382/290; 382/289; 358/462; 702/150

(58) Field of Classification Search
CPC .............................. G06T 7/004; G06K 9/3275
USPC ............................ 382/164, 290, 176; 358/462
See application file for complete search history.

(56) References Cited

U.S. PATENT DOCUMENTS

| | | | |
|---|---|---|---|
| 4,562,594 A * | 12/1985 | Bednar et al. | 382/174 |
| 4,984,285 A * | 1/1991 | Kano et al. | 382/270 |
| 5,592,572 A * | 1/1997 | Le | 382/289 |
| 5,892,842 A * | 4/1999 | Bloomberg | 382/173 |
| 6,470,094 B1 * | 10/2002 | Lienhart et al. | 382/176 |
| 7,016,536 B1 | 3/2006 | Ling et al. | |
| 2003/0133612 A1 * | 7/2003 | Fan | 382/199 |
| 2004/0202349 A1 * | 10/2004 | Erol et al. | 382/100 |
| 2005/0160194 A1 * | 7/2005 | Bango et al. | 710/8 |
| 2006/0221402 A1 * | 10/2006 | Jiang | 358/3.22 |
| 2009/0016605 A1 * | 1/2009 | Chao et al. | 382/176 |
| 2009/0103808 A1 * | 4/2009 | Dey et al. | 382/177 |
| 2009/0148043 A1 * | 6/2009 | Ophir et al. | 382/176 |
| 2009/0317000 A1 * | 12/2009 | Efimov | 382/216 |
| 2011/0158517 A1 * | 6/2011 | Dai | 382/165 |

OTHER PUBLICATIONS

Leedham, Graham, et al. "Separating text and background in degraded document images—a comparison of global thresholding techniques for multi-stage thresholding." Frontiers in Handwriting Recognition, 2002. Proceedings. Eighth International Workshop on. IEEE, 2002.*

Shijian Lu et al; Automatic Document Orientation Detection and Categorization through Document Vectorization; Department of Computer Science, School of Computing National University of Singapore; Oct. 23-27, 2006; pp. 1-4.

Daniel X Le et al; Automated Page Orientation and Skew Angle Detection for Binary Document Images; Lister Hill National Center for Biomedical Communications, National Library of Medicine,Bethesda, MA 20894, U.S.A; pp. 1-16.

(Continued)

*Primary Examiner* — Michelle Entezari
(74) *Attorney, Agent, or Firm* — Nathan R. Rieth

(57) ABSTRACT

In one embodiment, a method of detecting document orientation includes capturing a document image, binarizing each subimage of the document image to retain textual content and eliminate graphic and noise content from the document image, detecting portrait or landscape orientation based on values computed from strip-based projection profiles, and detecting up or down text orientation based on a text-asymmetry ratio computed from strip-based projection profiles.

17 Claims, 6 Drawing Sheets

(56) References Cited

OTHER PUBLICATIONS

Shijian Lu et al; Automatic Detection of Document Script and Orientation; Department of Computer Science, School of Computing National University of Singapore; pp. 1-5.

Daniel X. Le et al; Automated Portrait/Landscape Mode Detection on a Binary Image; Lister Hill National Center for Biomedical Communications National Library of Medicine Bethesda, MD; Oct. 27, 2003; pp. 1-12.

Readiris Pro 11 OCR for Macintosh; http://www.translation.net/readiris_mac_11.html.

* cited by examiner

SYSTEM AND METHOD FOR DOCUMENT ORIENTATION DETECTION

BACKGROUND

Despite ongoing advancements in computer technology and related consumer devices, most business information continues to exist on paper. Thus, converting paper documents into electronic form has become a standard practice that helps in managing, archiving and providing quick access to such documents. An important step in converting paper documents into electronic form is scanning or imaging the documents. However, detecting the correct orientation of scanned documents can be challenging for a number of reasons. For example, feeding paper documents into a scanner, especially where the documents are scanned in bulk, often results in problems such as incorrect document orientation and image skewing. A correctly scanned document can be oriented in portrait mode (i.e., with horizontally printed text) or landscape mode (i.e., with vertically printed text). However, there are at least four degrees of freedom available when feeding a document into a scanner (i.e., 0°, 90°, 180°, and 270°). If zero degrees is the correct scanning orientation for a document, then at least three other scanning orientations result in an incorrect document orientation when the document is scanned. Scanning errors of a lesser degree can result in skewed images with text lines oriented at incorrect angles on the page (i.e., not exactly horizontal or vertical). In addition to problems related to scanning documents, the documents themselves have varying degrees of complexity such as different scripts, scan noise, text with graphics and/or pictures, single and multi-column formats, light text on dark background (i.e., reversed text), and varying color text on varying color backgrounds. Each of these factors contributes to challenges associated with proper document orientation. Ongoing efforts to improve the process of converting paper documents into electronic form involve developing more robust methods of document orientation detection that address these issues.

BRIEF DESCRIPTION OF THE DRAWINGS

The present embodiments will now be described, by way of example, with reference to the accompanying drawings, in which.

DETAILED DESCRIPTION

Overview of Problem and Solution

Figure 1:
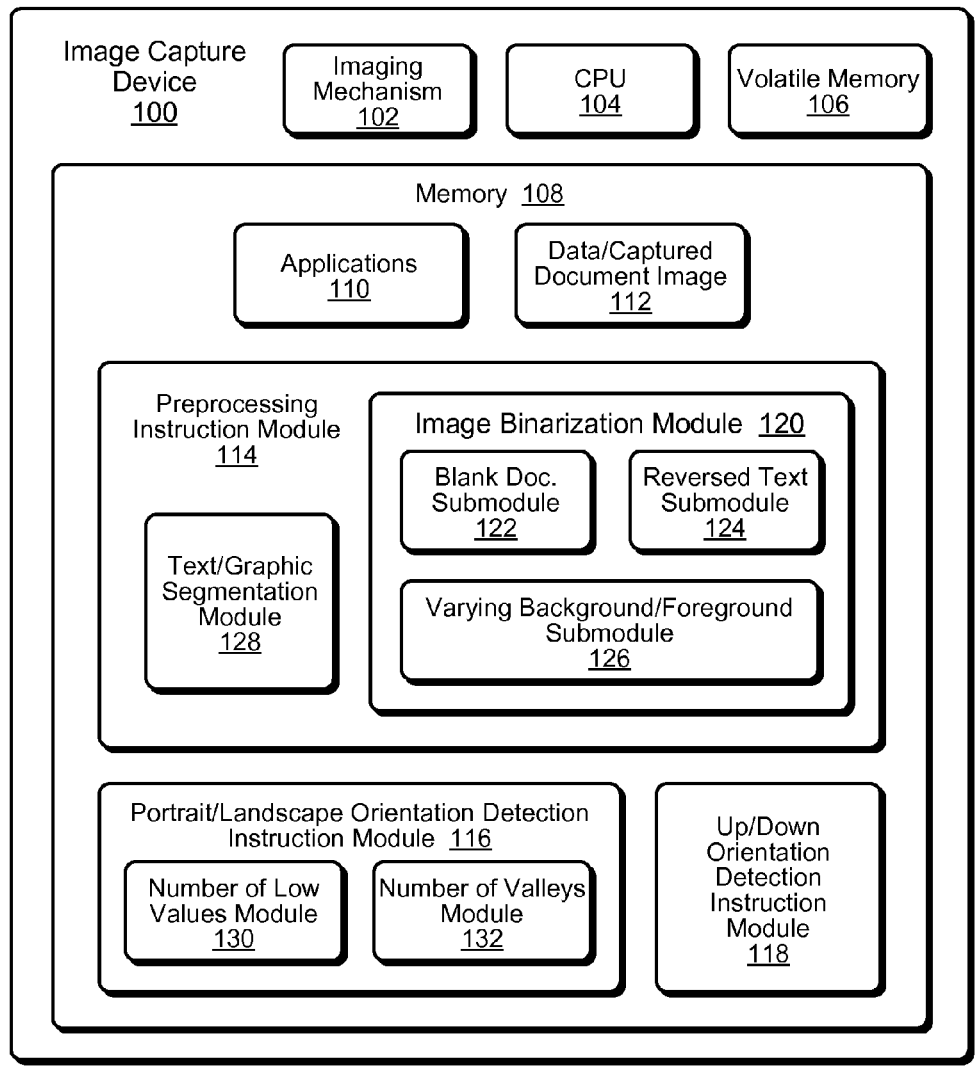
FIG. 1 shows an exemplary device suitable for implementing document orientation detection systems and methods, according to an embodiment.

As noted above, detecting the orientation of scanned documents is an important step in converting paper documents into electronic form. However, there are various challenges associated with detecting document orientation. For example, documents may have complex layouts that include graphics and/or pictures in addition to text, single and multiple column formats, scan noise, light text on dark background, varying color text in varying color backgrounds, and pages with only a few text lines. In addition, placing a document on a scanner or feeding a document into a scanner in the correct orientation can be confusing to users, and often results in documents being scanned with incorrect page orientations and skewed text lines that have incorrect angles of orientation on the page.

Most prior methods of detecting document orientation assume text-only pages. For example, in one prior technique page orientation is based on variances of horizontal and vertical projection profiles in a binary image. However, because this variance-based technique emphasizes global rather than local variations, it is prone to mistakes when documents have more complex layouts that include graphics, pictures, diagrams, multiple columns, skewed text, and so on. In addition to assuming text-only pages, most prior methods of detecting document orientation (e.g., methods based on projection profiles and ascenders/descenders) are designed to analyze entire pages, rather than partial pages. These methods are therefore prone to failure because there is insufficient information available for a robust statistical analysis. Other more analytically intense methods such as recognition-driven methods are memory- and time-inefficient.

Embodiments of the present disclosure improve on prior methods of detecting document orientation generally by enhancing the classic projection profile method with a multi-stage, strip-based algorithm. A multi-stage, strip-based algorithm includes a preprocessing algorithm to binarize and remove noise from a captured image. Local binarization is performed to handle the problems of reversed text and varying foregrounds and backgrounds such as varying color text on varying color backgrounds. Based on the sizes of bounding boxes of connected components, graphics and/or pictures, and noise such as small dots are removed. A portrait/landscape orientation detection algorithm is then performed on the clean text page (i.e., page without graphics, pictures or noise) image based on values of the projection profiles computed from horizontal and vertical document strips (i.e., vertical and horizontal strips of the clean text page). An up/down orientation detection algorithm computes a document asymmetry value based on asymmetry values of document strips.

The disclosed method/algorithm enables page orientation detection of scanned documents that have various complex layouts, including documents containing graphics and/or pictures, text, single and multiple column formats, scan noise, light text on dark background, varying color text in varying color backgrounds, and pages with only a few text lines. The algorithm performs text segmentation on virtually all manner of complex page layouts. The use of vertical and horizontal document strips makes the algorithm moderately skew-tolerant, and the algorithm addresses issues of reverse text and varying foregrounds and backgrounds such as varying color text on varying color backgrounds, through local binarization of document sub-images.

In one example embodiment, a method of detecting document orientation includes capturing (e.g., scanning) a document image, binarizing each subimage of the captured document image to retain textual content and eliminate graphic and noise content from the captured document image, detecting portrait or landscape orientation based on values of the projection profiles computed from horizontal and vertical document strips, and detecting up or down text orientation based on a text-asymmetry ratio computed from document strips on a projection profile.

In another example embodiment, a document orientation detection system includes an imaging mechanism to capture (e.g., scan) a document image, a processor to detect document orientation of the captured document image, and one or more instruction modules, executable on the processor to binarize subimages of the captured document image, detect portrait or landscape document orientation based on values of the projection profiles computed from horizontal and vertical document strips, and detect up or down text orientation based on a text-asymmetry ratio computed from document strips for a projection profile. In one implementation an image capture device comprising the imaging mechanism is coupled via a network to a remote image processing device comprising the processor and the one or more instruction modules.

ILLUSTRATIVE EMBODIMENTS

FIG. 1 shows an exemplary device 100 suitable for implementing document orientation detection systems and methods as disclosed herein, according to an embodiment of the disclosure. Device 100 can be any suitable image capture device 100 capable of capturing a document image and implementing one or more algorithms that process the image to detect orientation of the captured document image. Thus, image capture device 100 may be implemented, for example, as a scanner, a copier, a digital camera, a PDA, a cell phone, a smart phone, and so on. Image capture device 100 includes an imaging mechanism 102 such as a charge-coupled device (CCD), complementary metal-oxide-semiconductor (CMOS), or contact image sensor (CIS) to convert an optical image of a document to an electric signal. Image capture device 100 typically includes various other input/output devices (not shown) such as a keyboard, a monitor, a touchscreen, and a mouse. Image capture device 100 also generally includes a processor (CPU) 104, a volatile memory 106 (i.e., RAM), and a nonvolatile memory 108 (e.g., ROM, hard disk, floppy disk, CD-ROM, etc.). Nonvolatile memory 108 provides storage for computer/processor-readable instructions, data structures, applications, program modules and other data for image capture device 100. Image capture device 100 may implement various application programs 110 stored in memory 108 or volatile memory 106 and executable on processor 104 to provide a user with the ability to perform various document imaging operations through scanning, photographing, or otherwise capturing a document image 112, or through receiving a previously captured document image 112. In one implementation, for example, image capture device 100 enables a user to place one or more documents on a platen and initiate optical scanning of the documents with an optical CCD array moving underneath the illuminated platen.

In one implementation, memory 108 of image capture device 100 includes various program instruction modules 114, 116, 118 executable on processor 104 to process a captured document image 112 in a multi-stage, strip-based, algorithm that detects document orientation. In a first stage, preprocessing instruction module 114 preprocesses an input document image 112 to obtain a clean text page from the binarized image that eliminates most of the graphics and/or pictures, and retains all of the text. Preprocessing instruction module 114 includes a number of submodules configured to implement several preprocessing steps.

Figure 2:
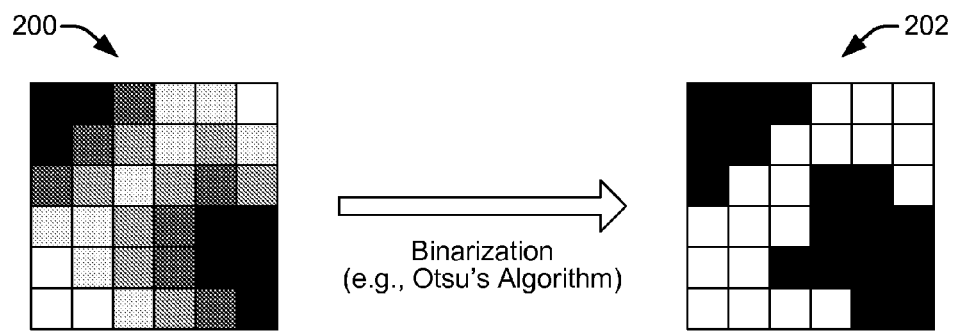
FIG. 2 demonstrates Otsu's thresholding algorithm being performed on a simple 6×6 grayscale pixel image, according to an embodiment.

In a first preprocessing step an image binarization submodule 120 implements Otsu's thresholding algorithm, which is a binarization algorithm well-known to those skilled in the art. Otsu's thresholding algorithm determines a threshold for binarization by iterating through all possible threshold values and calculating a measure of variance for pixel levels on either side of the threshold. Thus, pixels will fall into either the foreground or the background of the image. The threshold value is determined where the sum of foreground and background variances is at its minimum. FIG. 2 demonstrates Otsu's thresholding algorithm being performed on a simple 6×6 grayscale pixel image 200, according to an embodiment of the disclosure. Otsu's algorithm calculates foreground and background variances for a single threshold value. All pixels with a level less than the threshold fall into the foreground, while pixels with a level equal to or greater than the threshold fall into the background. The result is a binarized image 202 where the sum of foreground and background variances is at its minimum.

Figure 3:
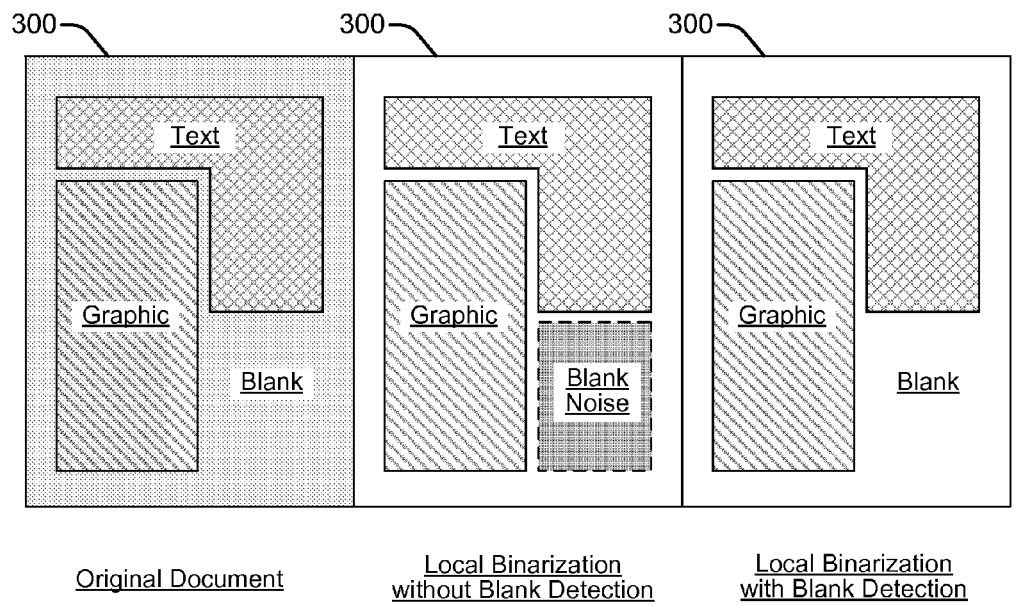
FIG. 3 shows an example of detecting blank sub-images in an example document that has text, graphics, and blank sub-images, according to an embodiment.

The image binarization submodule 120 of FIG. 1 implements a modified version of Otsu's algorithm to further enable identification of blank documents, reversed text in documents, and varying foregrounds and backgrounds in captured document images (e.g., varying color text on varying color backgrounds). Thus, a blank document submodule 122 identifies a blank document by analyzing the between-class variance at which the threshold was determined. A value of variance that is too low implies that the document is a blank document of uniform intensity. In addition to detecting completely blank document images, blank document submodule 122 also detects blank sub-images within the captured document image through performing local binarization. For a given sub-image, a variance value that is too low implies that the sub-image is a blank sub-image of uniform intensity. FIG. 3 shows an example of detecting blank sub-images in an example document 300 that has text, graphics, and blank sub-images, according to an embodiment of the disclosure. The captured document image 300 is divided into the sub-images, and each sub-image is binarized (i.e., local binarization). From the original captured document image, local binarization without blank detection provides the foreground and background separation of the text and graphics as discussed above, but it does not detect that a portion of the document is blank. Therefore, the blank portion of the captured document image appears as blank noise in the foreground. However, local binarization combined with blank detection detects the portion of the document that is blank and leaves the blank portion as background.

The image binarization submodule 120 also includes a reversed text submodule 124 configured to detect when a captured document image includes light text on a dark background. Some documents have light text on a dark background rather than the typical dark text on a light background. This is referred to as reversed text problem. To detect and remedy this problem, the reversed text submodule 124 determines the foreground and background of the document. Foreground and background determination is based on the assumption that more pixels occupy background than foreground. Using histograms, the probabilities of finding pixels lower than and higher than the computed threshold value are determined. The reversed text submodule 124 concludes that the document is of reversed text type if the probability of finding pixels lower than the threshold (dark pixels, corresponding to text in a normal document) is higher than the probability of finding pixels higher than the threshold. In the case of a reversed text type document, darker pixels are assigned an intensity value corresponding to the background, and lighter pixels are assigned an intensity value corresponding to the foreground. Thus, the resultant binarized image output contains black text on white background.

The image binarization submodule 120 also includes a varying background/foreground submodule 126 to detect when a captured document image includes background and foreground that are not uniform. For example, a document may include a section that contains normal text (i.e., dark text on light background) in addition to a section that contains reversed text (i.e., light text on dark background), or it may contain varying color text on varying color backgrounds. The varying background/foreground submodule 126 detects and remedies this problem by dividing the captured document image into a number of sub-images and applying Otsu's algorithm for thresholding to each of the sub-images. During this process, each sub-image is tested for blankness and reversed text, and then the sub-image is binarized. The resulting output is a binarized image having minimal loss of text when compared with the original document.

The preprocessing instruction module 114 also includes a text and graphic segmentation module 128. The segmentation module 128 removes graphics and/or pictures while retaining text in the document by performing connected component analysis on the captured document image. Sizes of bounding boxes of the connected components are analyzed. Connected component analysis is generally well-known to those skilled in the art. Briefly, a connected component is one in which pixels forming the component have connectivity, such as with a single character printed on a page. A bounding box is the smallest box defined by four X,Y coordinates that can surround the connected component. Sizes of bounding boxes for textual connected components typically lie within a certain range. Therefore, to separate graphics and/or pictures from text in a document, the segmentation module 128 discards as noise, all connected components that have bounding boxes with sizes that lie outside of a particular range. The result is that only the text in the document is retained while graphic and noise content is discarded or eliminated.

In a second stage of the disclosed multi-stage, strip-based algorithm, a portrait/landscape orientation detection module 116 determines portrait or landscape orientation of a captured document. The output of preprocessing module 114 is fed as input into the portrait/landscape orientation detection module 116. The output of the preprocessing instruction module 114 is a clean text page from a binarized image. The orientation detection module 116 detects portrait or landscape orientation of a document based on values of the projection profiles computed from horizontal and vertical document strips (i.e., vertical and horizontal strips of the clean text page).

Figure 4:
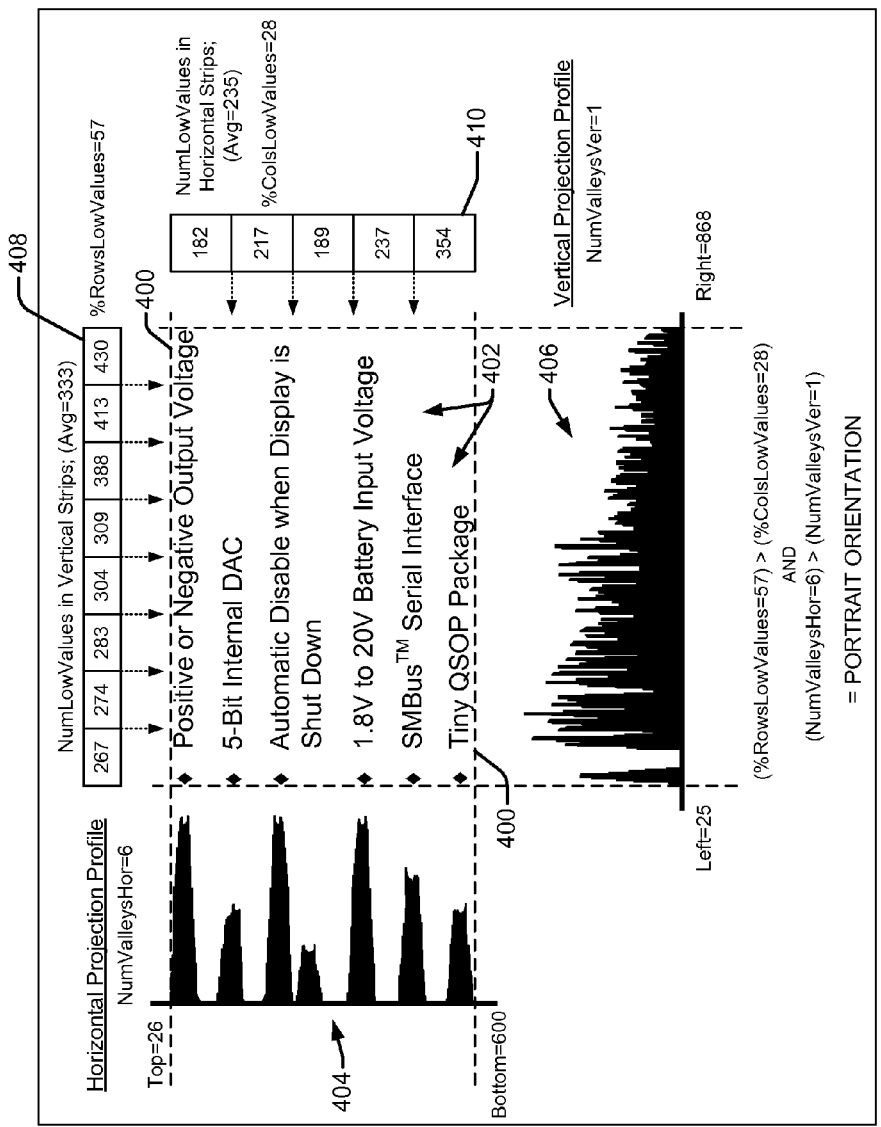
FIG. 4 shows an example of detecting the portrait/landscape orientation of a clean text page from a binarized image using a number-of-low-values and a number-of-valleys computed from strip-based projection profiles, according to an embodiment.

FIG. 4 shows an example of detecting the portrait/landscape orientation of a clean text page from the binarized image using a number-of-low-values and a number-of-valleys computed from strip-based projection profiles, according to an embodiment of the disclosure. In FIG. 4, the dashed-line box represents a bounding box 400 around the clean text 402 of the binarized image that has been output from the preprocessing module 114 and then input to the portrait/landscape orientation detection module 116. The horizontal projection profile 404 is shown along the left-hand side of FIG. 4, and it represents the total number of foreground pixels along each row of text in the image. The vertical projection profile 406 is shown at the bottom of FIG. 4, and it represents the total number of foreground pixels along each column of text in the image.

Margins of the binarized image 402 are computed using valleys and widths of the non-blank areas on the projection profiles. The margins define a bounding box 400 around the text content in the binarized document image 402. The margins, or bounding box 400, are used to discard the empty spaces around the text due mostly to page-margins, which helps to achieve better accuracy. The top, left corner of the bounding box 400 corresponds to the upper, left-most pixel at XY coordinate (25,26) in the text of the binarized image 402, while the bottom, right corner of the bounding box 400 corresponds to the lower, right-most pixel at XY coordinate (868,600) in the text of the image. Only the portion of the image 402 lying within the bounding box 400 is analyzed to detect document orientation.

Analyzing the content of the bounding box 400 includes computing two values from strips of both the horizontal projection profile 404 and the vertical projection profile 406. A Number of Low Values Module 130 computes the first value, which is a number-of-low-values (i.e., NumLowValues for vertical strips and for horizontal strips). The NumLowValues for the vertical and horizontal strips is subsequently converted to a percentage of low values (i.e., % RowsLowValues, % ColsLowValues). To compute the NumLowValues for the vertical projection profile 406, the bounding box 400 is divided into vertical strips 408 of a predefined range/width. The range of the vertical strips 408 in FIG. 4 is shown as the width of each box in the row of boxes across the top of FIG. 4. The vertical strips 408 project vertically downward through the bounding box 400 as indicated by the downward-pointing dotted arrows. A total number-of-low-values in each vertical strip 408 of the horizontal projection profile 404 is computed. That is, values on the horizontal projection profile that are less than a threshold value are totaled for each vertical strip 408. As shown in the FIG. 4 example, there are 8 vertical strips 408. The values in each of the boxes indicate the NumLowValues of horizontal projection profiles in each of the 8 vertical strips 408 (i.e., 267, 274, 283, 304, 309, 388, 413, 430). The average NumLowValues in the vertical strips is computed as Avg=(267+274+283+304+309+388+413+430)/(8 Vertical Strips)=333. From the average NumLowValues in the vertical strips 408, a percentage of rows having low values, or % RowsLowValues, is computed as Avg/(Bottom-Top)=333/(600−26)=57%. Therefore, the % RowsLowValues=57% indicates the percentage of rows of pixels in the bounding box 400 having values less than a threshold value.

To compute the NumLowValues for the horizontal projection profile 404, the bounding box 400 is divided into horizontal strips 410 of a predefined range/width. The range of the horizontal strips 410 in FIG. 4 is shown as the width of each box in the row of boxes along the right side of FIG. 4. The horizontal strips 410 project horizontally to the left through the bounding box 400 as indicated by the left-pointing dotted arrows. A total number-of-low-values in each horizontal strip 410 of the vertical projection profile 406 is computed. That is, values on the vertical projection profile 406 that are less than a threshold value are totaled for each horizontal strip 410. As shown in the FIG. 4 example, there are 5 horizontal strips 410. The values in each of the boxes indicate the number-of-low-values in each of the 5 horizontal strips 410 (i.e., 182, 217, 189, 237, 354). The average NumLowValues for the horizontal strips 410 is computed as Avg=(182+217+189+237+354)/(5 Horizontal Strips)=235. From the average NumLowValues in the horizontal strips 410, a percent of columns of low values, or % ColsLowValues, is computed as Avg/(Right−Left)=235/(868−25)=28%. Therefore, the % ColsLowValues=28% indicates the percentage of columns of pixels in the bounding box 400 having values less than a threshold value.

A Number of Valleys Module 132 analyzes the content of the bounding box 400 to compute a second value, which is a number-of-valleys (i.e., NumValleysHor for the horizontal projection profile 404, and NumValleysVer for the vertical projection profile 406). The number-of-valleys is the number of dips in the horizontal and vertical projection profiles. The number of dips in the horizontal and vertical projection profiles is visually observable in the FIG. 4 example. Thus, the NumValleysHor=6, in the FIG. 4 example, while the NumValleysVer=1.

The portrait/landscape orientation detection module 116 uses the values computed in modules 130 and 132 to determine whether the scanned document 112 is in portrait or landscape orientation. Generally, for a portrait document, the computed % RowsLowValues is greater than the computed % ColsLowValues. Conversely, for a landscape document the computed % RowsLowValues is less than the computed % ColsLowValues. Regarding the number-of-valleys computations, the NumValleysHor value for portrait documents is typically greater than the NumValleysVer value. Conversely, the NumValleysHor value for landscape documents is typically less than the NumValleysVer value. The portrait/landscape orientation detection module 116 logically combines results from the number-of-low-values and number-of-valleys profile computations to determine the document orientation. Accordingly, as shown at the bottom of FIG. 4, because the (% RowsLowValues=57)>(% ColsLowValues=28), AND, the (NumValleysHor=6)>(NumValleysVer=1), the orientation detection module 116 determines that the orientation of the scanned document in this example is Portrait. In general, the orientation detection module 116 determines portrait and landscape orientation as follows:

(% RowsLowValues)>(% ColsLowValues)

AND (NumValleysHor)>(NumValleysVer)=Portrait (% RowsLowValues)<(% ColsLowValues)

AND (NumValleysHor)<(NumValleysVer)=Landscape

However, in some cases the number-of-valleys computation may fail, such as when a document contains only a few lines of text. In such cases where the number-of-low-values and number-of-valleys profile computations provide inconsistent results, the orientation detection module 116 gives priority to the number-of-low-values result over the number-of-valleys result.

Figure 5:
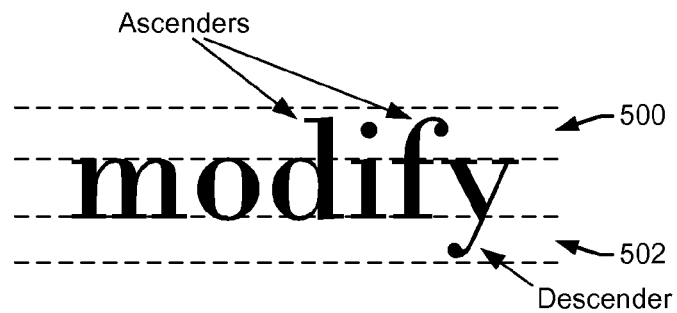
FIG. 5 shows an example of Roman characters that lie in zones, according to an embodiment.

In a third stage of the disclosed multi-stage, strip-based algorithm, an up/down orientation detection module 118 detects text orientation by computing text-asymmetry values of document strips while using bounding boxes that contain text areas within the document strips. Text-asymmetry refers to the higher frequency of occurrence of ascenders over descenders in a document written in Roman script language. FIG. 5 shows an example of Roman characters that lie in zones, according to an embodiment of the disclosure. Ascenders are the characters that lie in the top zone 500, while descenders lie in the bottom zone 502. Thus, in the FIG. 5 example, the characters d, i, and f, are ascenders, while the character y is a descender. The probability of occurrence of ascenders is approximately 4 times that of descenders in a document containing a reasonable amount of text. In addition, for documents written in English, the frequencies of occurrence of lower-case letters in top, middle and bottom zones are 26.5%, 67.25% and 6.25%, respectively.

The up/down orientation detection module 118 computes gradients of vertical strips of a horizontal projection profile. The gradient (i.e., slope) of the horizontal projection profile reflects the up/down asymmetry of the text. The asymmetry ratio is positive for documents orientated upside-down, while it is negative for the documents oriented right-side up. Thus, for a document classified as portrait orientation by the orientation detection module 116, the up/down orientation detection module 118 further classifies it as a document oriented at 0 degrees (right-side up) or 180 degrees (upside-down).

Figure 6:
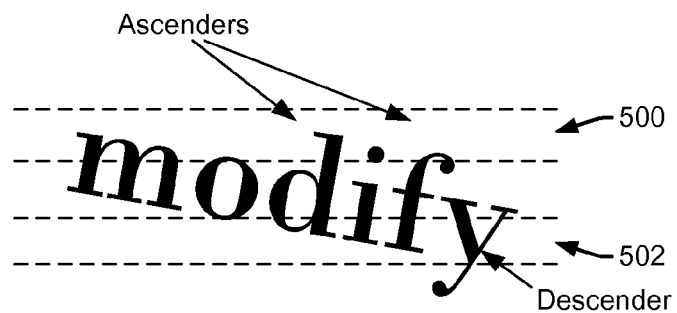
FIG. 6 shows an example of skewed text, according to an embodiment.
Figure 7:
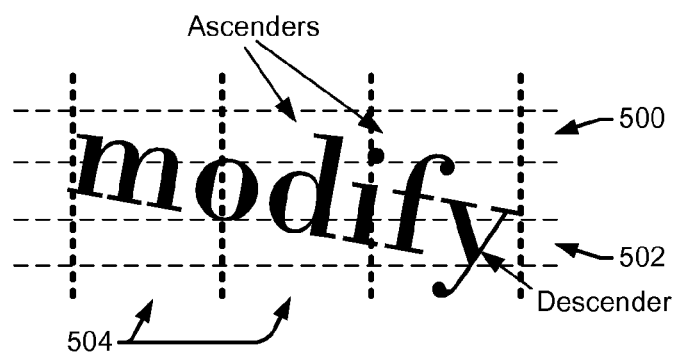
FIG. 7 shows an example of skewed text with vertical document strips from which horizontal projection profiles are generated, according to an embodiment.

However, when text is skewed on a page, the pixel counts used to determine text-asymmetry may not be accurate. FIG. 6 shows an example of skewed text, according to an embodiment. From the skewed text shown in FIG. 6, it is apparent that the pixel counts in the top zone 500 and bottom zone 502, that are used to determine text-asymmetry (i.e., ascenders and descenders) will be inaccurate because the skewed text falls incorrectly into the different zones (500, 502). Accordingly, the up/down orientation detection module 118 performs the text-asymmetry measure with respect to document strips. FIG. 7 shows an example of skewed text with vertical document strips 504 from which horizontal projection profiles are generated (not shown in FIG. 7, but see FIG. 4 for example). Using the vertical document strips 504 effectively adjusts the windows for counting pixels in the top zone 500 and bottom zone 502, and results in a more accurate count of ascendant and descendant pixels that accounts for the skew in the text. Therefore, an asymmetry ratio that is positive is more likely to correctly classify a document as being oriented upside-down (i.e., at 180 degrees), while an asymmetry ratio that is negative is more likely to correctly classify a document as being right-side up (i.e., at 0 degrees).

Figure 8:
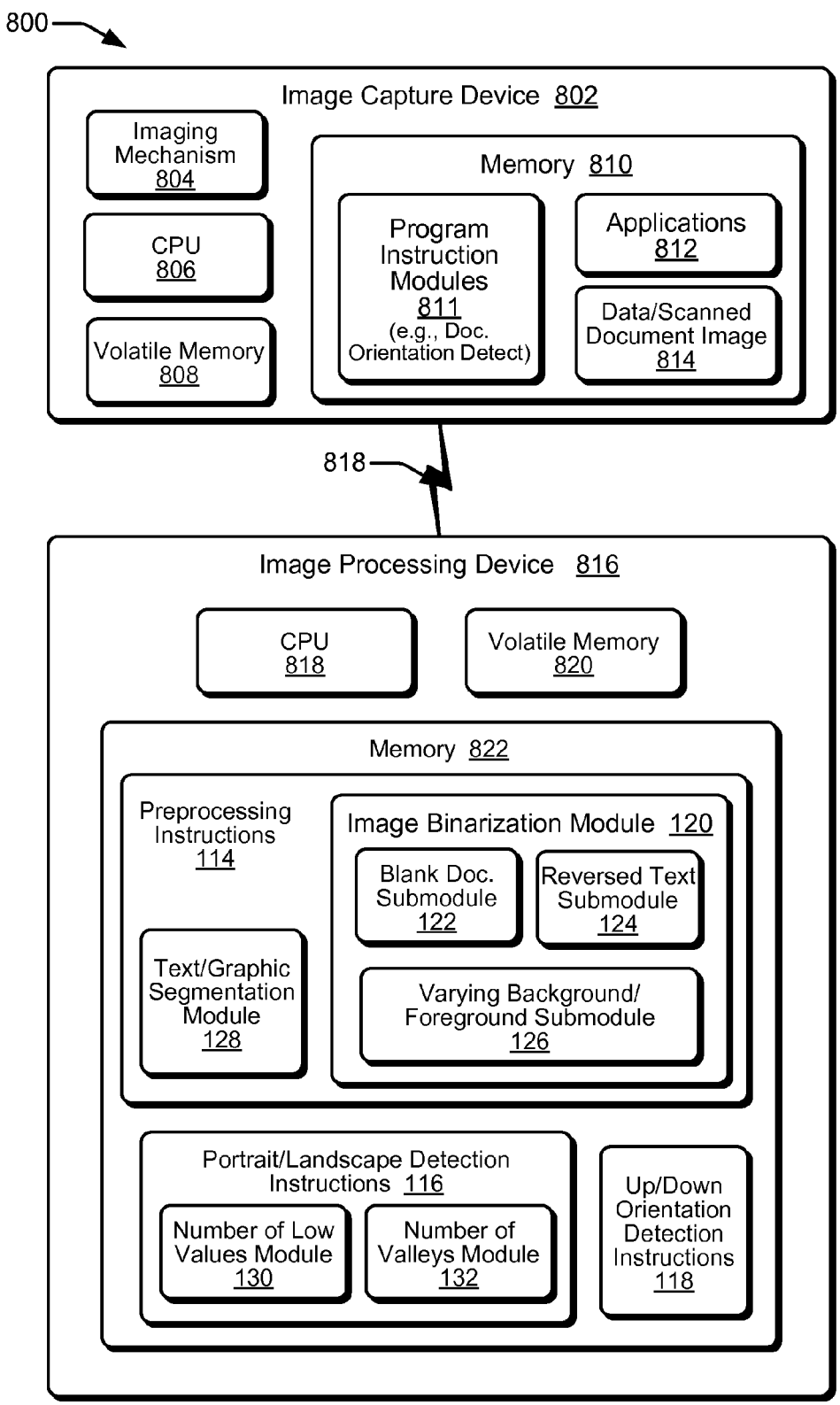
FIG. 8 shows an exemplary environment suitable for implementing document orientation detection systems and methods, according to an embodiment.

FIG. 8 shows an exemplary environment 800 suitable for implementing document orientation detection systems and method as disclosed herein, according to an embodiment of the disclosure. Environment 800 includes an image capture device 802 configured similar to or the same as the image capture device 100 discussed above with regard to FIG. 1. Thus, image capture device 802 is capable of capturing a document image and may be implemented, for example, as a scanner, a copier, a digital camera, a PDA, a cell phone, a smart phone, and so on. Likewise, image capture device 802 includes an imaging mechanism 804 such as a charge-coupled device (CCD), complementary metal-oxide-semiconductor (CMOS), or contact image sensor (CIS) to convert an optical image of a document to an electric signal.

Like the image capture device 100 discussed above, image capture device 802 typically includes various other input/output devices (not shown), a processor (CPU) 806, a volatile memory 808 (i.e., RAM), and a nonvolatile memory 810 (e.g., ROM, hard disk, floppy disk, CD-ROM, etc.). Image capture device 802 may implement various application programs 812 stored in memory 810 or volatile memory 808 and executable on processor 806 to provide a user with the ability to perform various document imaging operations through scanning, photographing, or otherwise capturing a document image 814, or through receiving a previously captured document image 814. In one implementation, for example, image capture device 802 enables a user to place one or more documents on a platen and initiate optical scanning of the documents with an optical CCD array moving underneath the illuminated platen.

Image capture device 802 may also store in memory, and execute on processor 806, various program instruction modules 811 for document orientation detection that process a captured document image 814 in a multi-stage, strip-based, algorithm to detect document orientation. Thus, image capture device 802 may include modules such as modules 114, 116, and 118, discussed above to process a captured document image 814 in the same manner as discussed above. However, as shown in FIG. 8, environment 800 includes an image processing device 816 coupled to image capture device 802 through a network 818. Thus, environment 800 facilitates local image capture/acquisition of a document image 814 on image capture device 802 with remote processing of the document image 814 on image processing device 816. As shown in FIG. 8, image processing device 816 includes the same preprocessing instructions 114 with related binarization 120 and segmentation 128 modules, portrait/landscape orientation detection module 116 with related sub-modules 130 and 132, and up/down orientation detection module 118, as discussed above with regard to the image capture device 100 of FIG. 1. Thus, the remote processing on image processing device 816 of a captured document image 814 proceeds in the same manner as discussed above.

Network 818 coupling image capture device 802 with image processing device 816 is intended to represent any of a variety of conventional network topologies and types (including optical, wired and/or wireless networks), employing any of a variety of conventional network protocols (including public and/or proprietary protocols). Network 818 may include, for example, a home network, a corporate network, or the Internet, as well as one or more local area networks (LANs) and/or wide area networks (WANs) and combinations thereof.

Image processing device 816 can be any of a variety of computing devices such as a server, comprising an arrangement of computer hardware and software configured to provide services to clients such as image capture device 802. Image processing device 816 typically provides other services in addition to the document orientation detection processing discussed herein. Such services may vary widely and might include, for example, email services, news services, entertainment media services, credit card services, banking services, investment services, and the like. Image processing device 816 may be implemented as any of a variety of conventional computing devices, including, for example, a desktop PC, a notebook or portable computer, a workstation, a mainframe computer, an Internet appliance, combinations thereof, and so on. Image processing device 816 may include various input/output devices (not shown) such as a keyboard, a mouse, and a monitor. Image processing device 816 also generally includes a processor (CPU) 818, a volatile memory 820 (i.e., RAM), and a nonvolatile memory 822 (e.g., ROM, hard disk, floppy disk, CD-ROM, etc.). Nonvolatile memory 822 generally provides storage of computer/processor-readable instructions, data structures, program modules and other data. Image processing device 816 may implement various application programs and instructions stored in memory 820 and/or 822 or volatile memory such as previously discussed (e.g., preprocessing instructions 114 with related binarization 120 and segmentation 128 modules, portrait/landscape orientation detection module 116 with related sub-modules 130 and 132, up/down orientation detection module 118).

Figure 9:
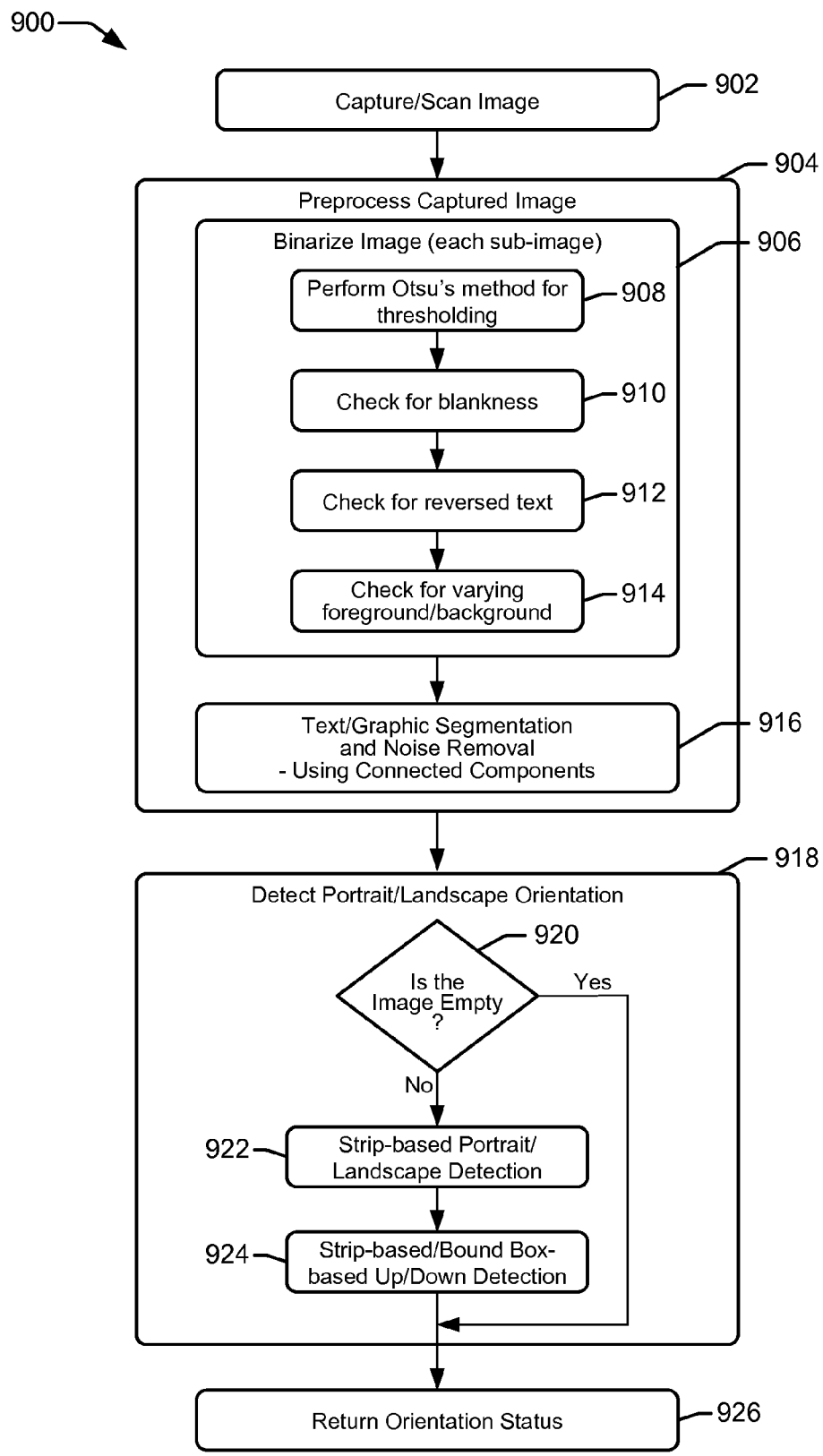
FIG. 9 shows a flowchart of an example method of detecting document orientation, according to an embodiment.

FIG. 9 shows a flowchart of an example method 900 of detecting document orientation, according to an embodiment of the disclosure. Method 900 is associated with the embodiments discussed above with regard to FIGS. 1-8, and details of the steps shown in method 900 can be found in the related discussion of such embodiments. Although method 900 includes steps listed in a particular order, it is to be understood that some of the steps may occur in different orders while achieving the same result. Thus, the illustrated steps are not necessarily limited to being performed in the order shown.

Method 900 begins at block 902 with capturing or scanning a document image, such as discussed above with regard to image capture devices 100 and 802. At block 904, preprocessing of the captured image begins. A first step in the preprocessing stage is to binarize the captured document image and/or sub-images as shown at block 906. Binarizing document images includes as an initial step shown at block 908, of performing Otsu's thresholding algorithm in order to determine a threshold for binarization. At block 910, the document image (sub-images) is checked for blankness, and at block 912 the document image is checked for reversed text. The document image is also checked for varying foreground and background as shown at block 914. Once the document image is binarized, the preprocessing continues at block 916 with segmenting the text from graphics and/or pictures and noise in the document image. Segmenting removes graphics, pictures and noise, while retaining text in the document, by performing connected component analysis on the document image. Therefore, the output of the preprocessing step 904 is a clean text page from the binarized image.

After the document image is preprocessed, the document orientation is detected, as shown at block 918. Document orientation detection includes portrait/landscape orientation detection and up/down text orientation. Prior to detecting document orientation, as shown at decision block 920, a determination is made as to whether or not the image is empty. If the document image is not empty (i.e., it includes text), then at block 922 the portrait/landscape orientation of the clean text page is detected using a number-of-low-values and a number-of-valleys computed from strip-based vertical and horizontal projection profiles. At block 924, the up/down orientation of the text is also checked on the basis of document strips and bounding boxes around each text connected component. The orientation status is returned at block 926.

What is claimed is:

1. A method of detecting document orientation comprising: capturing a document image; binarizing, by a processor, each subimage of the captured document image; retaining, by the processor, textual content and eliminating graphic and noise content from the captured document image; determining, by the processor, a plurality of values including a text-asymmetry ratio, from strip-based projection profiles of the captured document image, the strip-based projection profiles being non-square and located within a bounding box; detecting, by the processor, portrait or landscape orientation based on the values other than the text-asymmetry ratio; and detecting, by the processor, up or down text orientation based on the text-asymmetry ratio, wherein the portrait or landscape orientation is detected based on the values other than the text-asymmetry ratio in that the text-asymmetry ratio is not used to determine the portrait or landscape orientation.

2. A method as in claim 1, wherein binarizing each subimage comprises:
performing Otsu's thresholding algorithm to determine a threshold for binarization;
detecting if a subimage is blank;
detecting when a subimage includes light text on a dark background; and detecting if a subimage has varying background and foreground.

3. A method as in claim 2, wherein detecting when a subimage includes light text on a dark background comprises detecting when a subimage includes varying colored text on varying colored background.

4. A method as in claim 1, wherein detecting portrait or landscape orientation based on values computed from strip-based projection profiles comprises:
   computing a number-of-low-values for vertical document strips and for horizontal document strips; and
   computing a number-of-valleys from a strip-based horizontal projection profile and from a strip-based vertical projection profile.

5. A method as in claim 4, further comprising:
   converting a number-of-low-values for vertical document strips and for horizontal document strips into a percentage of rows having low values (% RowsLowValues) and a percentage of columns having low values (% ColsLowValues); and
   logically combining the % RowsLowValues and % ColsLowValues with the number-of-valleys to determine a portrait or landscape document orientation.

6. A method as in claim 1, wherein detecting up or down text orientation comprises:
   computing gradients of vertical document strips of a horizontal projection profile to find the text-asymmetry ratio;
   determining an upside-down text orientation for a positive text-asymmetry ratio; and
   determining a right-side up text orientation for a negative text-asymmetry ratio.

7. A method as in claim 2, wherein detecting if a subimage is blank comprises:
   analyzing between-class variance at which the threshold for binarization was determined; and
   determining that the subimage is blank when the variance is below the threshold.

8. A method as in claim 2, wherein detecting when a subimage includes light text on a dark background comprises:
   determining probabilities of finding pixels lower than and higher than the threshold for binarization;
   detecting that the subimage includes light text on a dark background when the probability of finding pixels lower than the threshold is higher than the probability of finding pixels higher than the threshold.

9. A method as in claim 2, wherein detecting if a subimage has varying background and foreground comprises:
   applying Otsu's thresholding algorithm to each subimage; and
   during application of Otsu's thresholding algorithm, testing for subimage blankness and reversed text.

10. A method as in claim 1, further comprising segmenting text from graphics, pictures and noise in the captured document image.

11. A method as in claim 10, wherein segmenting comprises:
    performing connected component analysis on the captured document image; and
    discarding as noise, all connected components that have bounding boxes with sizes that lie outside a set range.

12. A document orientation detection system comprising: an imaging mechanism to capture a document image; a processor to detect document orientation of the captured document image; and one or more instruction modules, executable on the processor to binarize subimages of the document, to determine a plurality of values including a text-asymmetry ratio from strip-based projection profiles of the captured document image, the strip-based projection profiles being non-square and located within a bounding box, to detect portrait or landscape document orientation based on the values other than the text-asymmetry ratio, and to detect up or down text orientation based on the text-asymmetry ratio, wherein the portrait or landscape orientation is detected based on the values other than the text-asymmetry ratio in that the text-asymmetry ratio is not used to determine the portrait or landscape orientation.

13. A document orientation detection system as in claim 12, further comprising an image capture device comprising the imaging mechanism, the processor, and the one or more instruction modules.

14. A document orientation detection system as in claim 12, further comprising:
    an image capture device comprising the imaging mechanism; and
    a remote image processing device comprising the processor and the one or more instruction modules.

15. A document orientation detection system as in claim 14, further comprising a network coupling the image capture device and the remote image processing device.

16. The method as in claim 1, wherein the portrait or landscape orientation is detected separately from and independently of the up or down text orientation.

17. The document orientation detection system as in claim 12, wherein the portrait or landscape orientation is detected separately from and independently of the up or down text orientation.

* * * * *